US012388935B2

(12) United States Patent
Iwamoto

(10) Patent No.: US 12,388,935 B2
(45) Date of Patent: Aug. 12, 2025

(54) RECORDING DEVICE

(71) Applicant: SEIKO EPSON CORPORATION, Tokyo (JP)

(72) Inventor: Masaharu Iwamoto, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 18/543,223

(22) Filed: Dec. 18, 2023

(65) Prior Publication Data

US 2024/0214498 A1 Jun. 27, 2024

(30) Foreign Application Priority Data

Dec. 21, 2022 (JP) ................. 2022-204325

(51) Int. Cl.
*H04N 1/00* (2006.01)
*G06F 21/32* (2013.01)

(52) U.S. Cl.
CPC ......... *H04N 1/00496* (2013.01); *G06F 21/32* (2013.01)

(58) Field of Classification Search
None
See application file for complete search history.

(56) References Cited

U.S. PATENT DOCUMENTS

2017/0366498 A1\* 12/2017 Green .................. G10L 17/06
2019/0306345 A1\* 10/2019 Kohara ............... G06F 3/0412

FOREIGN PATENT DOCUMENTS

| JP | 2013-038690 A | 2/2013 |
| JP | 2019-042998 A | 3/2019 |

\* cited by examiner

*Primary Examiner* — Duane N Taylor, Jr.
(74) *Attorney, Agent, or Firm* — WORKMAN NYDEGGER

(57) ABSTRACT

An outer peripheral section of a tilt panel includes a first side surface section that extends along a second direction, the second direction intersecting with a first direction, a second side surface section that extends along the second direction, a third side surface section that extends along the first direction and that connects an end section of the first side surface section, at least one of the first side surface section, the second side surface section, and the third side surface section is provided with a tilt operation section which is a section protruding outward from the tilt panel, and the tilt operation section is provided at a position overlapping an arrangement region of a touch panel in at least one of the first direction and the second direction in a plan view of the touch panel.

10 Claims, 12 Drawing Sheets

RECORDING DEVICE

The present application is based on, and claims priority from JP Application Serial Number 2022-204325, filed Dec. 21, 2022, the disclosure of which is hereby incorporated by reference herein in its entirety.

BACKGROUND

1. Technical Field

The present disclosure relates to a recording device that performs recording on a medium.

2. Related Art

In a printer as an example of a recording device, as shown in JP-A-2019-042998, an operation panel on which various setting operations can be performed by a user is provided so as to be pivotable, that is, tiltable with respect to a device main body.

In an operation panel, in a case where a section on which various setting operations can be performed by a user is configured by a touch panel, a frame section is formed between an outer periphery of the operation panel and an outer periphery of the touch panel. The frame section is a region in which the touch panel does not respond to a user's touch, and is a section that the user touches when the operation panel is pivoted.

However, in recent years, while the size of the touch panel is increased to improve operability, the size of the operation panel is maintained to suppress the increase in size, or the size of the operation panel is not allowed to be increased as much as the touch panel, so that the frame section tends to be reduced.

When the frame section is reduced in size, a region that can be touched by a user when the operation panel is pivoted is reduced, operability when the operation panel is pivoted is reduced, and there is an increased possibility that a user unintentionally touches the touch panel to cause an erroneous operation.

SUMMARY

A recording device according to the present disclosure for solving the above-described problem includes a recording unit configured to perform recording on a medium; a tilt panel that is configured to tilt and that performs various setting operations for a device main body including the recording unit; and a rotation shaft for tilting the tilt panel, wherein the tilt panel includes a housing forming an outer peripheral section of the tilt panel and a touch panel provided on a part of the housing, the outer peripheral section includes a first side surface section that extends along a second direction, the second direction intersecting with a first direction, the first direction being an axial direction of the rotation shaft, a second side surface section that extends along the second direction and that is at an opposite side from the first side surface section, a third side surface section that extends along the first direction and that connects an end section of the first side surface section farther from the rotation shaft and an end section of the second side surface section farther from the rotation shaft, at least one of the first side surface section, the second side surface section, and the third side surface section is provided with a tilt operation section which is a section protruding outward from the tilt panel, and the tilt operation section is provided at a position overlapping an arrangement region of the touch panel in at least one of the first direction and the second direction in a plan view of the touch panel.

DESCRIPTION OF EMBODIMENTS

Figure 1:
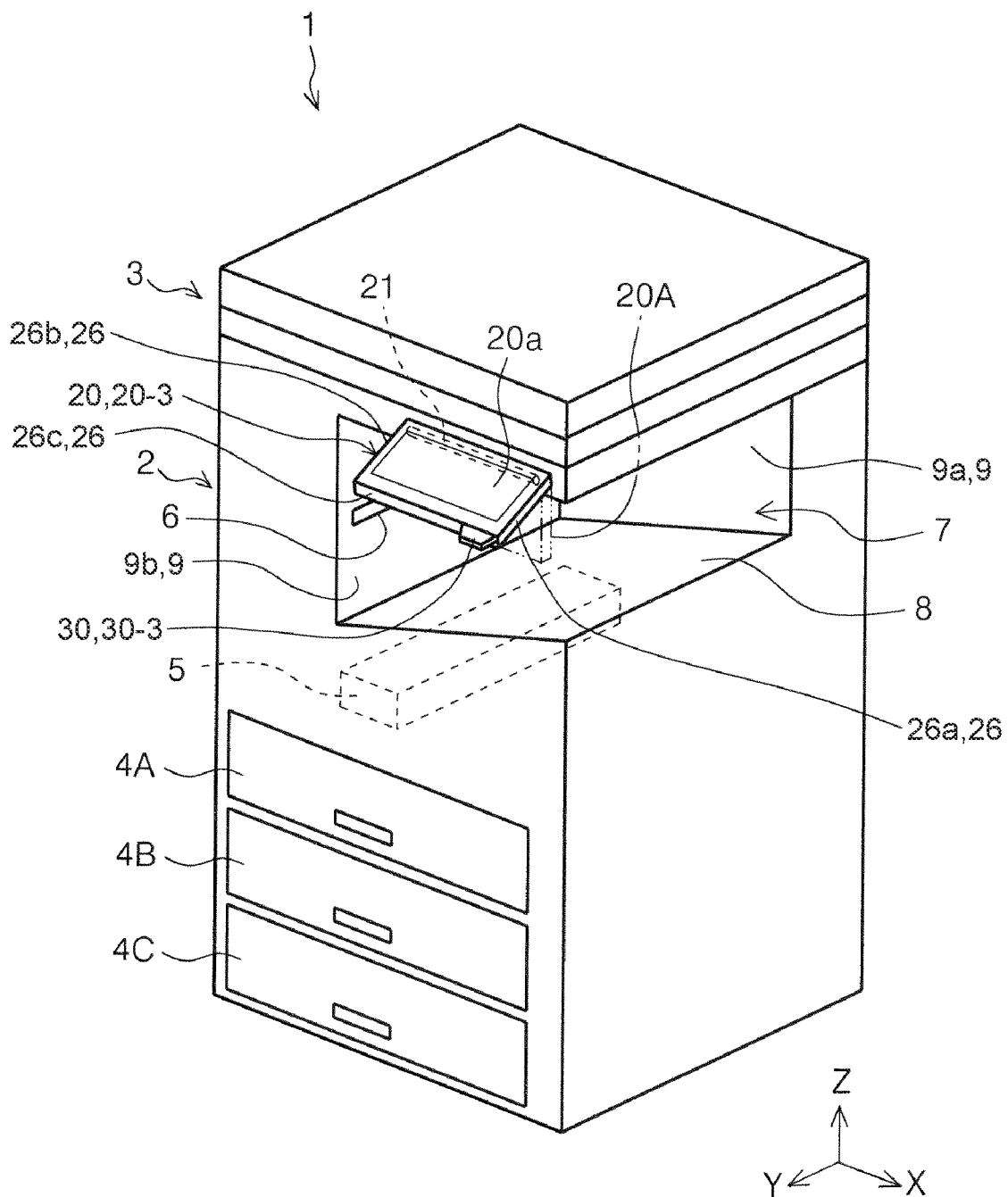
FIG. 1 is a perspective view of a printer viewed from a front side.

The following is a description of the present disclosure in general terms.

A recording device according to a first aspect includes a recording unit configured to perform recording on a medium; a tilt panel that is configured to tilt and that performs various setting operations for a device main body including the recording unit; and a rotation shaft for tilting the tilt panel, wherein the tilt panel includes a housing forming an outer peripheral section of the tilt panel and a touch panel provided on a part of the housing, the outer peripheral section includes a first side surface section that extends along a second direction, the second direction intersecting with a first direction, the first direction being an axial direction of the rotation shaft, a second side surface section that extends along the second direction and that is at an opposite side from the first side surface section, a third side surface section that extends along the first direction and that connects an end section of the first side surface section farther from the rotation shaft and an end section of the second side surface section farther from the rotation shaft, at least one of the first side surface section, the second side surface section, and the third side surface section is provided with a tilt operation section which is a section protruding outward from the tilt panel, and the tilt operation section is provided at a position overlapping an arrangement region of the touch panel in at least one of the first direction and the second direction in a plan view of the touch panel.

According to the aspect, even when the frame section around the touch panel becomes small and it becomes easy for a user to touch the touch panel when performing a tilt operation of the tilt panel, the user can perform the tilt operation of the tilt panel while suppressing the user from touching the touch panel by placing a finger on the tilt operation section, operability when pivoting the tilt panel is improved, and it is possible to suppress the user from unintentionally touching the touch panel and causing an erroneous operation.

In the present specification, the term "overlap" means that, for example, in a case where the tilt operation section and an arrangement region of the touch panel overlap each other in the first direction, at least a part of the tilt operation section and at least a part of the arrangement region of the touch panel are located at the same position in the first direction.

A second aspect is an aspect dependent on the first aspect, wherein an operation icon is displayed on the touch panel and the tilt operation section is provided at a position overlapping an arrangement region of the operation icon in at least one of the first direction and the second direction in a plan view of the touch panel.

According to the aspect, even when the frame section around the touch panel becomes small and it becomes easy for a user to touch the operation icon when performing a tilt operation of the tilt panel, the user can perform the tilt operation of the tilt panel while suppressing the user from touching the operation icon by placing a finger on the tilt operation section, operability when pivoting the tilt panel is improved, and it is possible to suppress the user from unintentionally touching the operation icon and causing an erroneous operation.

A third aspect is an aspect dependent on the first aspect, wherein the tilt operation section is provided on the first side surface section or the second side surface section, and is formed to have a size including an entire region of the touch panel in the second direction.

According to the aspect, since the tilt operation section is provided on the first side surface section or the second side surface section, and is formed to have a size including an entire region of the touch panel in the second direction, a user can easily place his/her finger on the tilt operation section.

The aspect may be dependent not on the first aspect but on the second aspect.

A fourth aspect is an aspect dependent on the first aspect, wherein the tilt operation section is provided on the third side surface section and is formed to have a size including an entire region of the touch panel in the first direction.

According to the aspect, since the tilt operation section is provided on the third side surface section and is formed to have a size including an entire region of the touch panel in the first direction, it is easy for a user to place a finger on the tilt operation section.

The aspect may be dependent not on the first aspect but on the second aspect.

A fifth aspect is an aspect dependent on the first aspect, wherein the tilt operation section integrally includes a first tilt operation section provided on the first side surface section or the second side surface section and a second tilt operation section provided on the third side surface section.

According to the aspect, since the tilt operation section integrally includes a first tilt operation section provided on the first side surface section or the second side surface section and a second tilt operation section provided on the third side surface section, the degree of freedom of a position where a user places a finger on the tilt operation section is improved, and operability is improved.

A sixth aspect is an aspect dependent on the first aspect, wherein the tilt operation section includes a fingerprint authentication section for performing fingerprint authentication of a user.

According to this aspect, since the tilt operation section includes a fingerprint authentication section for performing fingerprint authentication of a user, a dedicated space for arranging the fingerprint authentication section is not required, and the size of the device can be reduced.

The aspect may be dependent not on the first aspect but on any one of the second to fifth aspects.

A seventh aspect is an aspect dependent on the first aspect, wherein the tilt operation section is provided configured to switch between a first state in which the tilt operation section protrudes outward from the tilt panel and a second state in which the tilt operation section does not protrude outward from the tilt panel in a plan view of the touch panel.

According to the aspect, since the tilt operation section is provided configured to switch between a first state in which the tilt operation section protrudes outward from the tilt panel and a second state in which the tilt operation section does not protrude outward from the tilt panel in a plan view of the touch panel, by setting the tilt operation section to the second state, tilt panel can be made compact when the tilt operation section is not required.

The aspect may be dependent not on the first aspect but on any one of the second to sixth aspects.

Hereinafter, the present disclosure will be specifically described.

Hereinafter, an inkjet printer 1 will be described as an example of a recording device. Hereinafter, the inkjet printer 1 will be simply referred to as a printer 1.

In the X-Y-Z coordinate system shown in FIG. 1, an X-axis direction is a device width direction. A Y-axis direction is a device depth direction, and is a width direction of a sheet, which is an example of a medium. In the present embodiment, among side surfaces constituting the periphery of the printer 1, a side surface provided with a tilt panel 20, that is, a side surface in a +Y direction is a front surface of the device, and a side surface in a −Y direction is a rear surface of the device.

A Z-axis direction is a direction along the vertical direction and is a device height direction. The +Z direction is a vertically upward direction, and the −Z direction is a vertically downward direction.

In FIG. 1, a printer 1 includes a device main body 2 including a recording head 5 which is an example of a recording unit that performs recording on a sheet, and a scanner section 3 which is an example of an image reading device provided on a upper section of the device main body 2, and is configured as a multifunction device including a document reading function and a facsimile function in addition to an inkjet recording function.

Three sheet feeding cassette 4A, 4B, and 4C are detachably provided in a lower section of the device main body 2. The sheet accommodated in each sheet feeding cassette is fed in a +X direction by a feeding unit (not shown), curved upward, inverted, transported in a −X direction, and fed to a position facing the recording head 5. Then, ink is ejected by the recording head 5 to perform recording.

In the embodiment, the recording head 5 is a so-called line head in which nozzles for ejecting ink are provided so as to cover an entire region in the Y-axis direction, that is, in a sheet width direction, and is configured as a recording head capable of recording on an entire sheet width without moving in the sheet width direction.

The sheet on which recording has been performed by the recording head 5 is transported in the −X direction, curved upward, inverted, transported in the +X direction, and discharged from a discharge port 6 in the +X direction. The sheets discharged from the discharge port 6 fall onto a discharge tray 8 and are stacked thereon.

The discharge port 6 faces a discharge space 7. The discharge space 7 is a space formed in the device main body 2 for discharging the sheet, and is constituted by a housing 9 and the discharge tray 8.

The discharge space 7 is formed by a first surface 9a of the housing 9, the second surface 9b of the housing 9, and the discharge tray 8, and is a space that is open in the +Y direction and the +X direction. The first surface 9a is parallel to the X-Z plane, and the second surface 9b is parallel to the Y-Z plane.

The device main body 2 includes a tilt panel 20 on the front surface of the device for performing various operation settings for device main body 2 and the scanner section 3, and for performing preview display of setting contents and a recorded image. Although the tilt panel 20 of FIG. 1 shows a tilt panel 20-3 which is one of a plurality of embodiments (to be described later), the tilt panel 20 may be a tilt panel 20 according to another embodiment.

The tilt panel 20 is provided on the device main body 2 via a rotation shaft 21 having an axial center line parallel to the X-axis direction, and is provided so that a tilt angle can be adjusted by rotating about the rotation shaft 21. In the present embodiment, the rotation shaft 21 is configured as a free stop hinge, and is configured to be able to hold an arbitrary tilt angle. In the present embodiment, the tilt panel 20 can be tilted from a posture in which a front surface 20a is a vertical plane as indicated by a two dot chain line and a reference symbol 20A in FIG. 1 to a posture in which the front surface 20a is tilted upward as indicated by a solid line in FIG. 1, and further can be tilted to a posture in which the front surface 20a is a horizontal plane although not shown. The front surface 20a of the tilt panel 20 is a surface facing a user who performs an operation.

Hereinafter, the tilt panel 20 will be further described with reference to FIG. 2. Although the tilt panel 20-3, which is one of a plurality of embodiments (to be described later), is shown in FIG. 2, the tilt panel 20-3 may be a tilt panel according to another embodiment.

Figure 2:
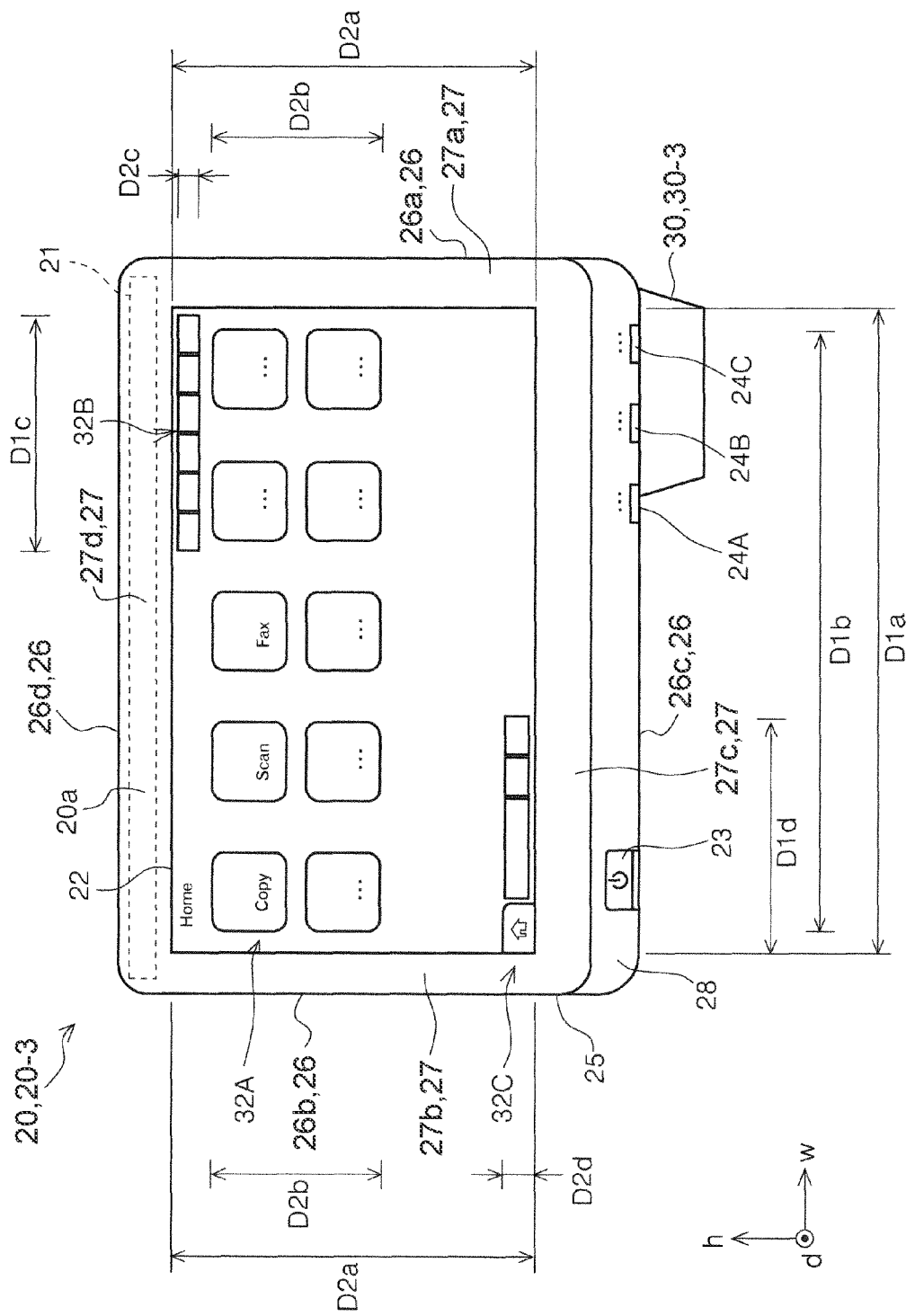
FIG. 2 is a plan view of a tilt panel with a rotation shaft on an upper side.

In FIG. 2 and subsequent drawings, the w-h-d coordinate system is used instead of the X-Y-Z coordinate system shown in FIG. 1. A w-axis direction is a horizontal direction in a plan view of the touch panel 22 and is an example of a first direction. The w-axis direction is an axial direction of the rotation shaft 21. In the w-axis direction, a +w direction is a right direction as viewed from a user, and a −w direction is a left direction.

An h-axis direction is a vertical direction in a plan view of the touch panel 22, and is an example of a second direction orthogonal to the first direction. In the h-axis direction, a +h direction is an upward direction as viewed from a user, and a −h direction is a downward direction.

A d-axis direction is a thickness direction in a plan view of the touch panel 22, a +d direction is a direction from a back surface to a front surface of the touch panel 22, and a −d direction is a direction from the front surface to the back surface of the touch panel 22.

Hereinafter, the configuration of the tilt panel 20, the arrangement of the operation icons, and the like may be described using terms "upper", "lower", "left", and "right", and in this case, the terms mean the directions of "upper", "lower", "left", and "right" when the touch panel 22 is viewed in a plan view as shown in FIG. 2.

The tilt panel 20 includes a front surface 20a formed of a cover glass, a touch panel 22 under the front surface 20a, and a liquid crystal display section (not shown) under the touch panel 22. In the present embodiment, the outline of the touch panel 22 and the outline of the liquid crystal display section are substantially the same. As the touch panel 22, an electrostatic capacitance type, a resistive membrane type, an optical type, an electromagnetic induction type, and the like are known, and the electrostatic capacitance type is used in the present embodiment. In the present embodiment, a user's operation on the front surface 20a of the tilt panel 20 is basically a touch operation on the touch panel 22.

An outer peripheral section 26 of the tilt panel 20 is formed by a housing 25. The outer peripheral section 26 includes a first side surface section 26a extending in the vertical direction on a right side of the tilt panel 20, and a second side surface section 26b extending in the vertical direction on a left side of the tilt panel 20 and opposite to the first side surface section 26a.

Further, the outer peripheral section 26 includes a third side surface section 26c extending in a left-right direction on an upper side of the tilt panel 20. The third side surface section 26c is a section connecting an end section (−h direction end section) of the first side surface section 26a far from the rotation shaft 21 and an end section (−h direction end section) of the second side surface section 26b far from the rotation shaft 21. Furthermore, the outer peripheral section 26 includes a fourth side surface section 26d extending in the left-right direction on the upper side of the tilt panel 20.

The rotation shaft 21 is provided on the upper side of the tilt panel 20, that is, on an upper side of a center position in the vertical direction. The center position of the tilt panel 20 in the vertical direction is an intermediate position between the third side surface section 26c and the fourth side surface section 26d.

A frame section 27 is provided around the touch panel 22. The frame section 27 is a section formed around the touch panel 22. The frame section 27 includes a first frame section 27a extending in the vertical direction and located on a right side of the touch panel 22, a second frame section 27b extending in the vertical direction and located on a left side of the touch panel 22, a third frame section 27c extending in the left-right direction and located on a lower side of the touch panel 22, and a fourth frame section 27d extending in the left-right direction and located on an upper side of the touch panel 22.

For example, when the widths (lengths in the left-right direction) of the first frame section 27a and the second frame section 27b and the width (length in the left-right direction) of the third frame section 27c become small, it is difficult for a user to place his/her finger to tilt the tilt panel 20.

On a lower side of the third frame section 27c, a button arrangement region 28 is provided along the left-right direction. In the button arrangement region 28, a power button 23 for turning on and off the power of the printer 1, and status lamps 24A, 24B, and 24C for indicating a status of the printer 1 are arranged. The status lamps 24A, 24B, and 24C are provided so as to emit light on both the front surface 20a and the third side surface section 26c of the tilt panel 20.

Icon groups 32A, 32B, and 32C are displayed on the rectangular touch panel 22. Each of the icon groups 32A, 32B, and 32C includes a plurality of operation icons. For example, in FIG. 2, an icon group 32A is arranged in a central region of the touch panel 22, and is composed of operation icons such as "Copy", "Scan", and "Fax". An icon group 32B is arranged at an upper right of the touch panel 22, and an icon group 32C is arranged at a lower left of the touch panel 22.

A region D1a is an arrangement region of the touch panel 22 in the left-right direction, and a region D2a is an arrangement region of the touch panel 22 in the vertical direction.

A region D1b is an arrangement region of the icon group 32A in the left-right direction, and a region D2b is an arrangement region of the icon group 32A in the vertical direction.

A region D1c is an arrangement region of the icon group 32B in the left-right direction, and a region D2c is an arrangement region of the icon group 32B in the vertical direction. The region D1c is located on a right side of a center position in the left-right direction on the touch panel 22. The region D2c is located on an upper side of a center position in the vertical direction on the touch panel 22.

A region D1d is an arrangement region of the icon group 32C in the left-right direction, and a region D2d is an arrangement region of the icon group 32C in the vertical direction. The region D1d is located on a left side of the center position in the left-right direction on the touch panel 22. The region D2d is located on a lower side of the center position in the vertical direction on the touch panel 22.

Hereinafter, each embodiment of the tilt panel (tilt panels 20-1 to 20-25) will be described. When the embodiments of the tilt panel are not particularly distinguished from each other, they may be generically referred to as a tilt panel 20.

Tilt operation sections (tilt operation sections 30-1 to 30-25) are provided in each of the tilt panels described below. When the embodiments of the tilt operation section are not particularly distinguished from each other, they may be generically referred to as a tilt operation section 30.

Although the tilt operation section 30 is provided integrally with the housing 25 in each embodiment, the tilt operation section 30 may be configured separately from the housing 25 and then attached to the housing 25.

The tilt operation section 30 is formed flush with the front surface 20a so as not to have a step, but may have a step with the surface 20a. The thickness (length in the d-axis direction) of the tilt operation section 30 is formed to be smaller than the thickness (length in the d-axis direction) of the tilt panel 20, but may be equal to or larger than the thickness of the tilt panel 20.

Figure 3:
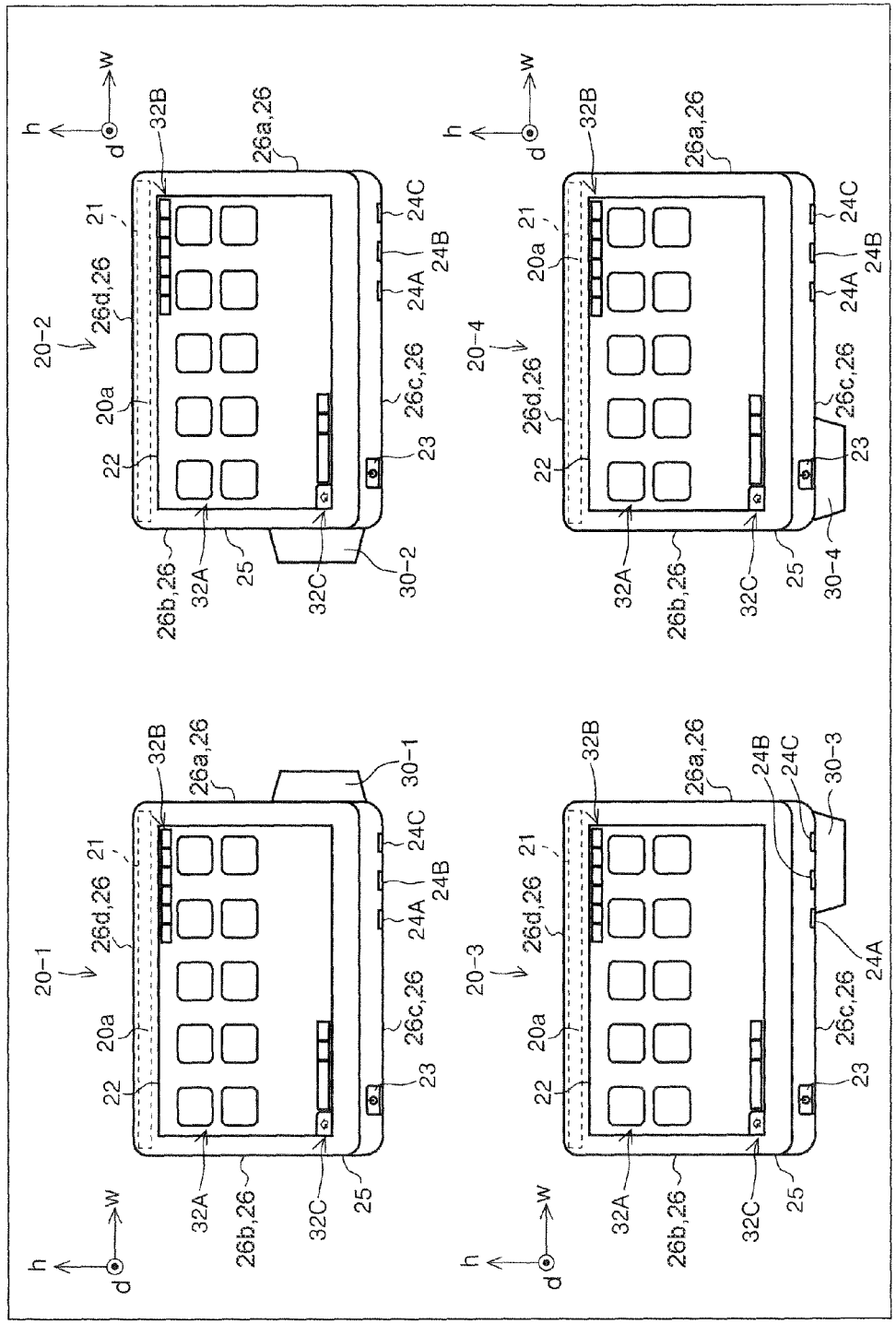
FIG. 3 is a plan view showing each embodiment of the tilt panel with the rotation shaft on the upper side.

A tilt panel 20-1 shown in FIG. 3 is a first embodiment of the tilt panel.

The tilt panel 20-1 includes a tilt operation section 30-1 on the first side surface section 26a on a right side. The tilt operation section 30-1 is a section protruding to a right side from the tilt panel 20-1.

The tilt operation section 30-1 is provided at a position overlapping the arrangement region (region D2a in FIG. 2) of the touch panel 22 in the vertical direction. That is, the tilt operation section 30-1 is arranged at a position for suppressing unintended contact with the touch panel 22 when a user performs a tilt operation on the tilt panel 20-1.

A tilt panel 20-2 shown in FIG. 3 is a second embodiment of the tilt panel.

The tilt panel 20-2 includes a tilt operation section 30-2 on the second side surface section 26b on a left side. The tilt operation section 30-2 is a section protruding to a left side from the tilt panel 20-2.

The tilt operation section 30-2 is provided at a position overlapping the arrangement region (region D2a in FIG. 2) of the touch panel 22 in the vertical direction. That is, the tilt operation section 30-2 is arranged at a position for suppressing unintended contact with the touch panel 22 when a user performs a tilt operation on the tilt panel 20-2.

The tilt operation section 30-2 is provided at a position overlapping the arrangement region (region D2d in FIG. 2) of the icon group 32C in the vertical direction. That is, the tilt operation section 30-2 is arranged at a position for suppressing unintended contact with the icon group 32C when a user performs a tilt operation on the tilt panel 20-2.

A tilt panel 20-3 shown in FIG. 3 is a third embodiment of the tilt panel.

The tilt panel 20-3 includes a tilt operation section 30-3 on a right side with respect to a center position in the left-right direction on the third side surface section 26c on a lower side. The tilt operation section 30-3 is a section protruding to a lower side from the tilt panel 20-3.

The tilt operation section 30-3 is provided at a position overlapping the arrangement region (region D1a in FIG. 2) of the touch panel 22 in the left-right direction. That is, the tilt operation section 30-3 is arranged at a position for suppressing unintended contact with the touch panel 22 when a user performs a tilt operation on the tilt panel 20-3.

A tilt panel 20-4 shown in FIG. 3 is a fourth embodiment of the tilt panel.

The tilt panel 20-4 includes a tilt operation section 30-4 on a left side with respect to the center position in the left-right direction on the third side surface section 26c on a lower side. The tilt operation section 30-4 is a section protruding to a lower side from the tilt panel 20-4.

The tilt operation section 30-4 is provided at a position overlapping the arrangement region (region D1a in FIG. 2) of the touch panel 22 in the left-right direction. That is, the tilt operation section 30-4 is arranged at a position for suppressing unintended contact with the touch panel 22 when a user performs a tilt operation on the tilt panel 20-4.

Figure 4:
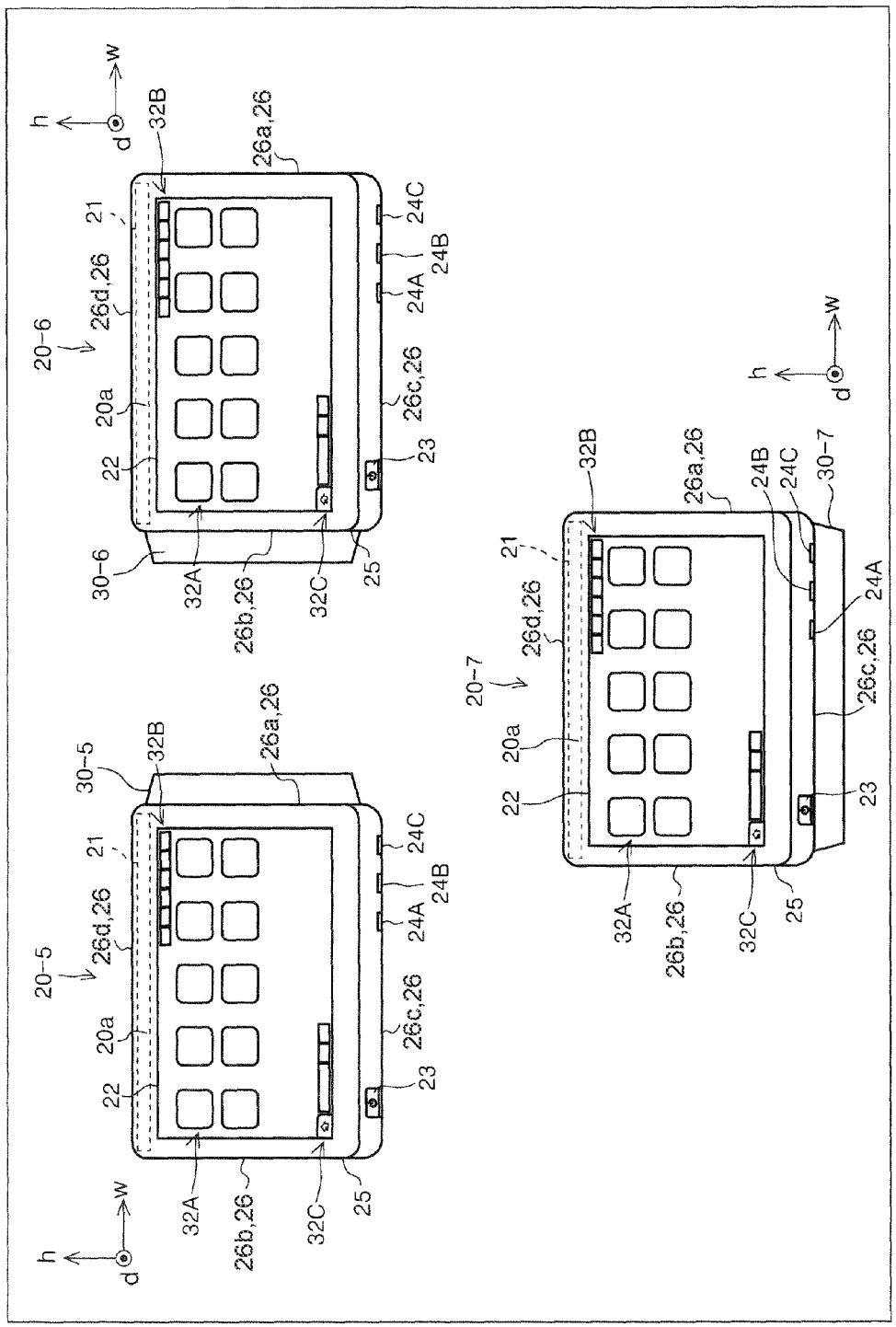
FIG. 4 is a plan view showing each embodiment of the tilt panel with the rotation shaft on the upper side.

A tilt panel 20-5 shown in FIG. 4 is a fifth embodiment of the tilt panel.

The tilt panel 20-5 includes a tilt operation section 30-5 on the first side surface section 26a on a right side. The tilt operation section 30-5 is a section protruding to a right side from the tilt panel 20-5.

The tilt operation section 30-5 is provided at a position overlapping the arrangement region (region D2a in FIG. 2) of the touch panel 22 in the vertical direction. In addition, the tilt operation section 30-5 is formed to have a size including an entire region of the touch panel 22 in the vertical direction. That is, the tilt operation section 30-5 is arranged at a position for suppressing unintended contact with the touch panel 22 when a user performs a tilt operation on the tilt panel 20-5.

The tilt operation section 30-5 is provided at a position overlapping the arrangement region (region D2b in FIG. 2) of the icon group 32A in the vertical direction. That is, the tilt operation section 30-5 is arranged at a position for suppressing unintended contact with the icon group 32A when a user performs a tilt operation on the tilt panel 20-5.

The tilt operation section 30-5 is provided at a position overlapping the arrangement region (region D2c in FIG. 2) of the icon group 32B in the vertical direction. That is, the tilt operation section 30-5 is arranged at a position for suppressing unintended contact with the icon group 32B when a user performs a tilt operation on the tilt panel 20-5.

A tilt panel 20-6 shown in FIG. 4 is a sixth embodiment of the tilt panel.

The tilt panel 20-6 includes a tilt operation section 30-6 on the second side surface section 26b on a left side. The tilt operation section 30-6 is a section protruding to a left side from the tilt panel 20-6.

The tilt operation section 30-6 is provided at a position overlapping the arrangement region (region D2a in FIG. 2)

of the touch panel 22 in the vertical direction. In addition, the tilt operation section 30-6 is formed to have a size including an entire region of the touch panel 22 in the vertical direction. That is, the tilt operation section 30-6 is arranged at a position for suppressing unintended contact with the touch panel 22 when a user performs a tilt operation on the tilt panel 20-6.

The tilt operation section 30-6 is provided at a position overlapping the arrangement region (region D2b in FIG. 2) of the icon group 32A in the vertical direction. That is, the tilt operation section 30-6 is arranged at a position for suppressing unintended contact with the icon group 32A when a user performs a tilt operation on the tilt panel 20-6.

The tilt operation section 30-6 is provided at a position overlapping the arrangement region (region D2d in FIG. 2) of the icon group 32C in the vertical direction. That is, the tilt operation section 30-6 is arranged at a position for suppressing unintended contact with the icon group 32C when a user performs a tilt operation on the tilt panel 20-6.

A tilt panel 20-7 shown in FIG. 4 is a seventh embodiment of the tilt panel.

The tilt panel 20-7 includes a tilt operation section 30-7 on the third side surface section 26c on a lower side. The tilt operation section 30-7 is a section protruding to a lower side from the tilt panel 20-7.

The tilt operation section 30-7 is provided at a position overlapping the arrangement region (region D1a in FIG. 2) of the touch panel 22 in the left-right direction. In addition, the tilt operation section 30-7 is formed to have a size including an entire region of the touch panel 22 in the left-right direction. That is, the tilt operation section 30-7 is arranged at a position for suppressing unintended contact with the touch panel 22 when a user performs a tilt operation on the tilt panel 20-7.

Figure 5:
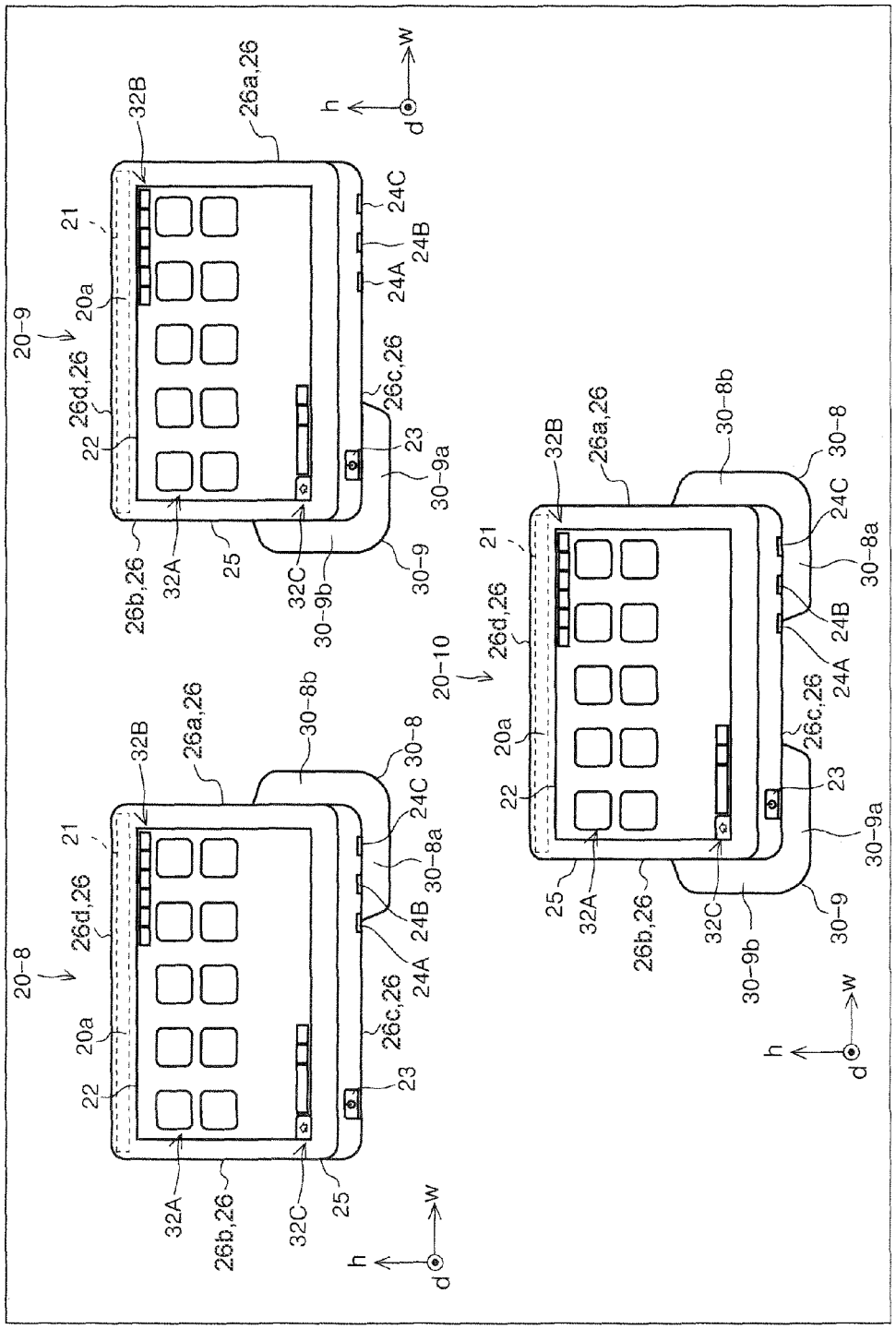
FIG. 5 is a plan view showing each embodiment of the tilt panel with the rotation shaft on the upper side.

A tilt panel 20-8 shown in FIG. 5 is an eighth embodiment of the tilt panel.

The tilt panel 20-8 includes a tilt operation section 30-8. The tilt operation section 30-8 integrally includes a first tilt operation section 30-8b provided on the first side surface section 26a and a second tilt operation section 30-8a provided on the third side surface section 26c. The first tilt operation section 30-8b is a section protruding to a right side from the tilt panel 20-8, and the second tilt operation section 30-8a is a section protruding to a lower side from the tilt panel 20-8.

The first tilt operation section 30-8b is provided at a position overlapping the arrangement region (region D2a in FIG. 2) of the touch panel 22 in the vertical direction. The second tilt operation section 30-8a is provided at a position overlapping the arrangement region (region D1a in FIG. 2) of the touch panel 22 in the left-right direction. That is, the tilt operation section 30-8 is arranged at a position for suppressing unintended contact with the touch panel 22 when a user performs a tilt operation on the tilt panel 20-8.

A tilt panel 20-9 shown in FIG. 5 is a ninth embodiment of the tilt panel.

The tilt panel 20-9 includes a tilt operation section 30-9. The tilt operation section 30-9 integrally includes a first tilt operation section 30-9b provided on the second side surface section 26b and a second tilt operation section 30-9a provided on the third side surface section 26c. The first tilt operation section 30-9b is a section protruding to a left side from the tilt panel 20-9, and the second tilt operation section 30-9a is a section protruding to a lower side from the tilt panel 20-9.

The first tilt operation section 30-9b is provided at a position overlapping the arrangement region (region D2a in FIG. 2) of the touch panel 22 in the vertical direction. The second tilt operation section 30-9a is provided at a position overlapping the arrangement region (region D1a in FIG. 2) of the touch panel 22 in the left-right direction. That is, the tilt operation section 30-9 is arranged at a position for suppressing unintended contact with the touch panel 22 when a user performs a tilt operation on the tilt panel 20-9.

The first tilt operation section 30-9b is provided at a position overlapping the arrangement region (region D2d in FIG. 2) of the icon group 32C in the vertical direction. That is, the tilt operation section 30-9 is arranged at a position for suppressing unintended contact with the icon group 32C when a user performs a tilt operation on the tilt panel 20-9.

A tilt panel 20-10 shown in FIG. 5 is a tenth embodiment of the tilt panel.

The tilt panel 20-10 includes both the tilt operation section 30-8 and the tilt operation section 30-9 described above.

Figure 6:
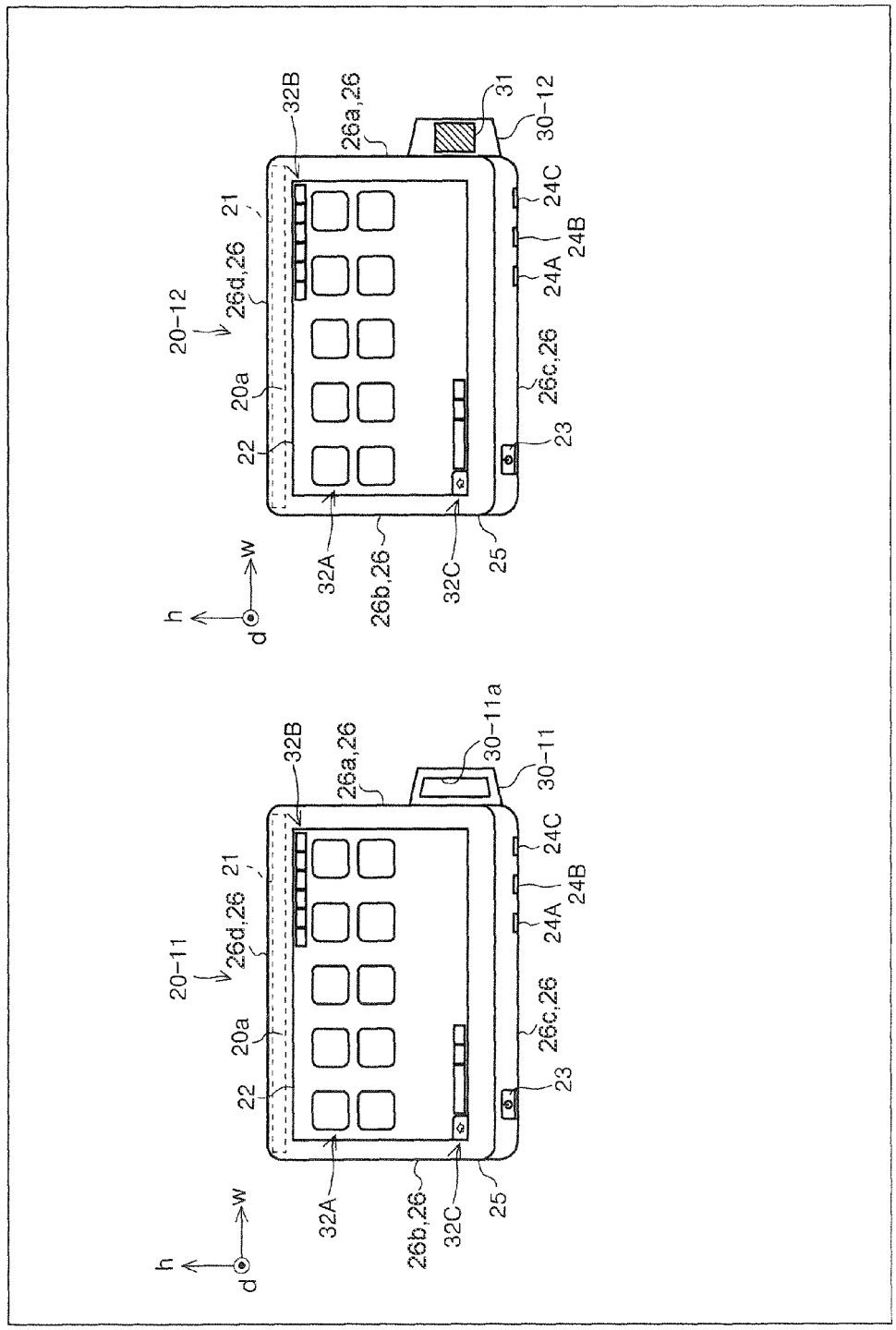
FIG. 6 is a plan view showing an embodiment of the tilt panel with the rotation shaft on the upper side.

A tilt panel 20-11 shown in FIG. 6 is an eleventh embodiment of the tilt panel.

The tilt panel 20-11 includes a tilt operation section 30-11 on the first side surface section 26a on a right side. The tilt operation section 30-11 is a section protruding to a right side from the tilt panel 20-11.

The tilt operation section 30-11 is provided at a position overlapping the arrangement region (region D2a in FIG. 2) of the touch panel 22 in the vertical direction. That is, the tilt operation section 30-11 is arranged at a position for suppressing unintended contact with the touch panel 22 when a user performs a tilt operation on the tilt panel 20-11.

The tilt operation section 30-11 is formed in a frame shape and includes an opening section 30-11a.

A tilt panel 20-12 shown in FIG. 6 is a twelfth embodiment of the tilt panel.

The tilt panel 20-12 includes a tilt operation section 30-12 on the first side surface section 26a on a right side. The tilt operation section 30-12 is a section protruding to a right side from the tilt panel 20-12.

The tilt operation section 30-12 is provided at a position overlapping the arrangement region (region D2a in FIG. 2) of the touch panel 22 in the vertical direction. That is, the tilt operation section 30-12 is arranged at a position for suppressing unintended contact with the touch panel 22 when a user performs a tilt operation on the tilt panel 20-12.

The tilt operation section 30-12 is provided with a fingerprint authentication section 31. The fingerprint authentication section 31 reads fingerprint information of a user and outputs a signal corresponding to the information to a control section (not shown). The user can use a security function of the printer 1, for example, a function such as authentication printing, by using the fingerprint authentication section 31.

Next, a case where the rotation shaft 21 is provided on a lower side of the tilt panel 20, that is, on a lower side of a center position in the vertical direction will be described with reference to FIG. 7 and the subsequent drawings.

Figure 7:
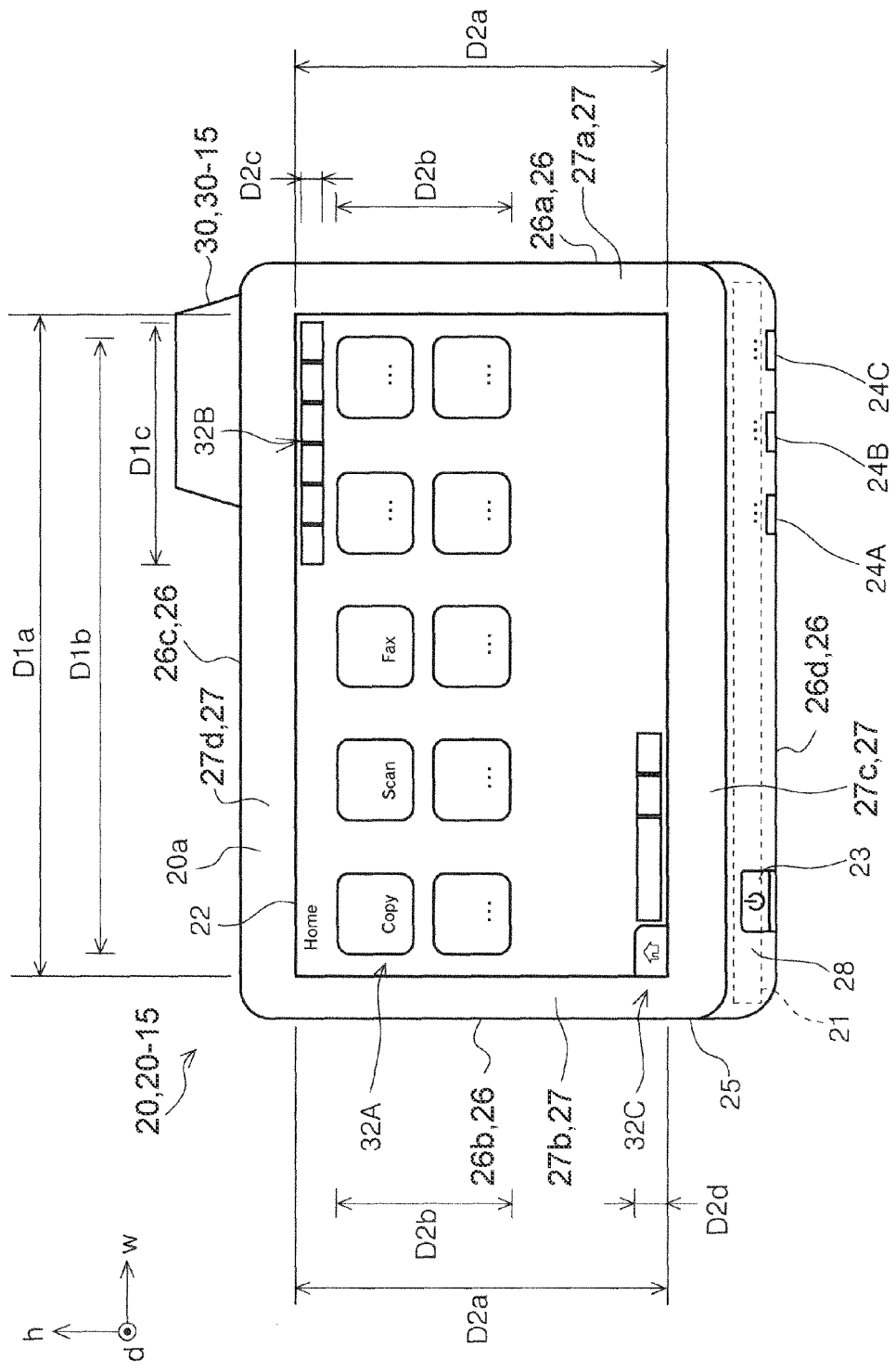
FIG. 7 is a plan view of the tilt panel with a rotation shaft on a lower side.

FIG. 7 shows, as an example, a tilt panel 20-15 according to a fifteenth embodiment which will be described below, and the same reference symbols are given to the same configurations as those already described.

In the embodiment described below, the rotation shaft 21 is provided on a lower side of the tilt panel 20 as shown in FIG. 7.

In the embodiment described below, the third side surface section 26c is an upper side surface of the tilt panel 20, and the fourth side surface section 26d is a lower side surface of the tilt panel 20.

Figure 8:
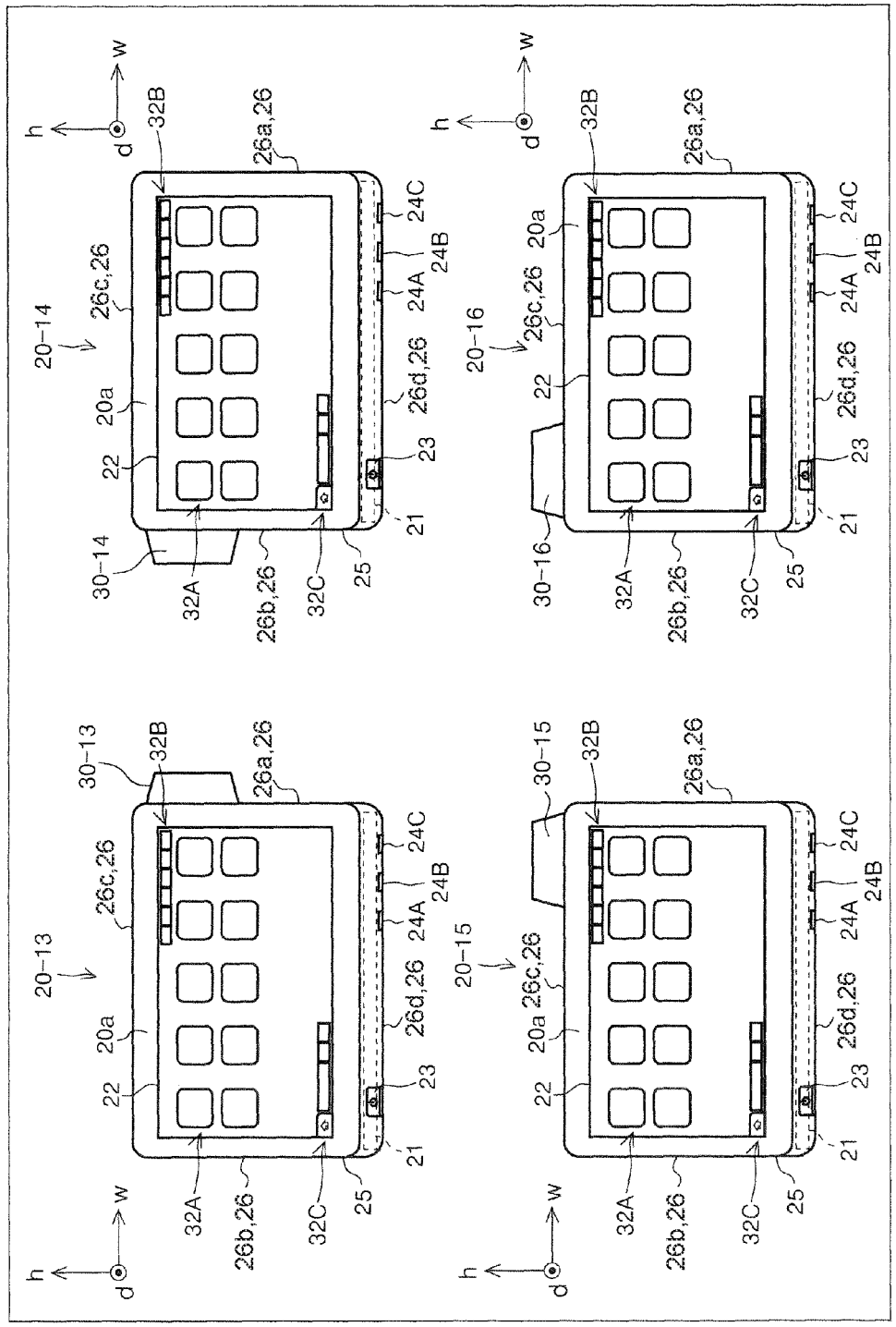
FIG. 8 is a plan view showing each embodiment of the tilt panel with the rotation shaft on the lower side.

A tilt panel 20-13 shown in FIG. 8 is a thirteenth embodiment of the tilt panel.

The tilt panel 20-13 includes a tilt operation section 30-13 on the first side surface section 26a on a right side. The tilt operation section 30-13 is a section protruding to a right side from the tilt panel 20-13.

The tilt operation section 30-13 is provided at a position overlapping the arrangement region (region D2a in FIG. 7) of the touch panel 22 in the vertical direction. That is, the tilt operation section 30-13 is arranged at a position for suppressing unintended contact with the touch panel 22 when a user performs a tilt operation on the tilt panel 20-13.

The tilt operation section 30-13 is provided at a position overlapping the arrangement region (region D2b in FIG. 7) of the icon group 32A in the vertical direction. That is, the tilt operation section 30-13 is arranged at a position for suppressing unintended contact with the icon group 32A when a user performs a tilt operation on the tilt panel 20-13.

The tilt operation section 30-13 is provided at a position overlapping the arrangement region (region D2c in FIG. 7) of the icon group 32B in the vertical direction. That is, the tilt operation section 30-13 is arranged at a position for suppressing unintended contact with the icon group 32B when a user performs a tilt operation on the tilt panel 20-13.

A tilt panel 20-14 shown in FIG. 8 is a fourteenth embodiment of the tilt panel.

The tilt panel 20-14 includes a tilt operation section 30-14 on the second side surface section 26b on a left side. The tilt operation section 30-14 is a section protruding to a left side from the tilt panel 20-14.

The tilt operation section 30-14 is provided at a position overlapping the arrangement region (region D2a in FIG. 7) of the touch panel 22 in the vertical direction. That is, the tilt operation section 30-14 is arranged at a position for suppressing unintended contact with the touch panel 22 when a user performs a tilt operation on the tilt panel 20-14.

The tilt operation section 30-14 is provided at a position overlapping the arrangement region (region D2b in FIG. 7) of the icon group 32A in the vertical direction. That is, the tilt operation section 30-14 is arranged at a position for suppressing unintended contact with the icon group 32A when a user performs a tilt operation on the tilt panel 20-14.

A tilt panel 20-15 shown in FIG. 8 is a fifteenth embodiment of the tilt panel.

The tilt panel 20-15 includes a tilt operation section 30-15 on a right side with respect to a center position in the left-right direction on the third side surface section 26c on an upper side. The tilt operation section 30-15 is a section protruding to an upper side from the tilt panel 20-15.

The tilt operation section 30-15 is provided at a position overlapping the arrangement region (region D1a in FIG. 7) of the touch panel 22 in the left-right direction. That is, the tilt operation section 30-15 is arranged at a position for suppressing unintended contact with the touch panel 22 when a user performs a tilt operation on the tilt panel 20-15.

The tilt operation section 30-15 is provided at a position overlapping the arrangement region (region D1b in FIG. 7) of the icon group 32A in the left-right direction. That is, the tilt operation section 30-15 is arranged at a position for suppressing unintended contact with the icon group 32A when a user performs a tilt operation on the tilt panel 20-15.

The tilt operation section 30-15 is provided at a position overlapping the arrangement region (region D1c in FIG. 7) of the icon group 32B in the left-right direction. That is, the tilt operation section 30-15 is arranged at a position for suppressing unintended contact with the icon group 32B when a user performs a tilt operation on the tilt panel 20-15.

A tilt panel 20-16 shown in FIG. 8 is a sixteenth embodiment of the tilt panel.

The tilt panel 20-16 includes a tilt operation section 30-16 on a left side with respect to a center position in the left-right direction on the third side surface section 26c on an upper side. The tilt operation section 30-16 is a section protruding to an upper side from the tilt panel 20-16.

The tilt operation section 30-16 is provided at a position overlapping the arrangement region (region D1a in FIG. 7) of the touch panel 22 in the left-right direction. That is, the tilt operation section 30-16 is arranged at a position for suppressing unintended contact with the touch panel 22 when a user performs a tilt operation on the tilt panel 20-16.

The tilt operation section 30-16 is provided at a position overlapping the arrangement region (region D1b in FIG. 7) of the icon group 32A in the left-right direction. That is, the tilt operation section 30-16 is arranged at a position for suppressing unintended contact with the icon group 32A when a user performs a tilt operation on the tilt panel 20-16.

Figure 9:
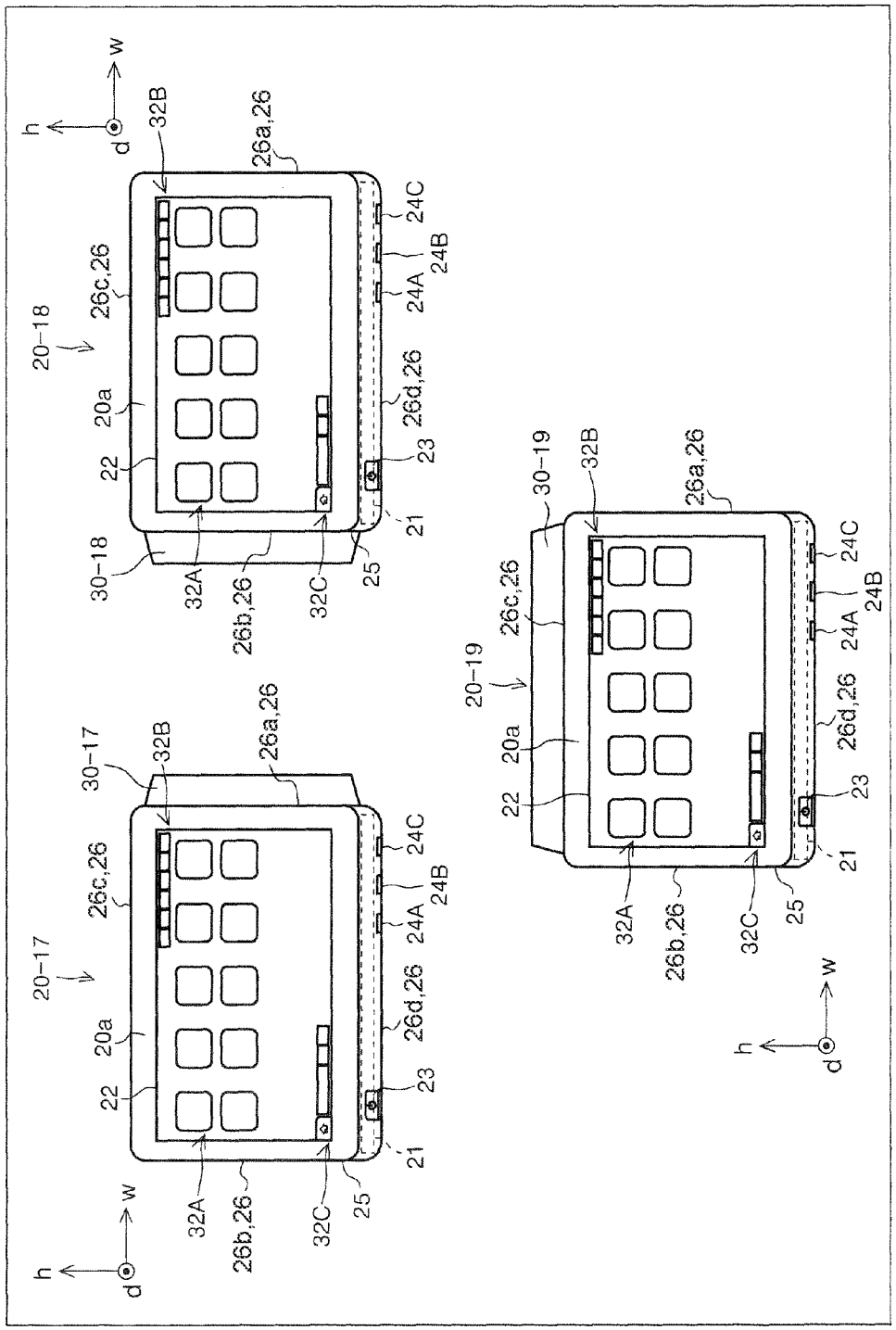
FIG. 9 is a plan view showing each embodiment of the tilt panel with the rotation shaft on the lower side.

A tilt panel 20-17 shown in FIG. 9 is a seventeenth embodiment of the tilt panel.

The tilt panel 20-17 includes a tilt operation section 30-17 on the first side surface section 26a on a right side. The tilt operation section 30-17 is a section protruding to a right side from the tilt panel 20-17.

The tilt operation section 30-17 is provided at a position overlapping the arrangement region (region D2a in FIG. 7) of the touch panel 22 in the vertical direction. In addition, the tilt operation section 30-17 is formed to have a size including an entire region of the touch panel 22 in the vertical direction. That is, the tilt operation section 30-17 is arranged at a position for suppressing unintended contact with the touch panel 22 when a user performs a tilt operation on the tilt panel 20-17.

The tilt operation section 30-17 is provided at a position overlapping the arrangement region (region D2b in FIG. 7) of the icon group 32A in the vertical direction. That is, the tilt operation section 30-17 is arranged at a position for suppressing unintended contact with the icon group 32A when a user performs a tilt operation on the tilt panel 20-17.

The tilt operation section 30-17 is provided at a position overlapping the arrangement region (region D2c in FIG. 7) of the icon group 32B in the vertical direction. That is, the tilt operation section 30-17 is arranged at a position for suppressing unintended contact with the icon group 32B when a user performs a tilt operation on the tilt panel 20-17.

A tilt panel 20-18 shown in FIG. 9 is an eighteenth embodiment of the tilt panel.

The tilt panel 20-18 includes a tilt operation section 30-18 on the second side surface section 26b on a left side. The tilt operation section 30-18 is a section protruding to a left side from the tilt panel 20-18.

The tilt operation section 30-18 is provided at a position overlapping the arrangement region (region D2a in FIG. 7) of the touch panel 22 in the vertical direction. In addition, the tilt operation section 30-18 is formed to have a size including an entire region of the touch panel 22 in the vertical direction. That is, the tilt operation section 30-18 is arranged at a position for suppressing unintended contact with the touch panel 22 when a user performs a tilt operation on the tilt panel 20-18.

The tilt operation section 30-18 is provided at a position overlapping the arrangement region (region D2b in FIG. 7) of the icon group 32A in the vertical direction. That is, the tilt operation section 30-18 is arranged at a position for suppressing unintended contact with the icon group 32A when a user performs a tilt operation on the tilt panel 20-18.

The tilt operation section 30-18 is provided at a position overlapping the arrangement region (region D2d in FIG. 7) of the icon group 32C in the vertical direction. That is, the tilt operation section 30-18 is arranged at a position for suppressing unintended contact with the icon group 32C when a user performs a tilt operation on the tilt panel 20-18.

A tilt panel 20-19 shown in FIG. 9 is a nineteenth embodiment of the tilt panel.

The tilt panel 20-19 includes a tilt operation section 30-19 on the third side surface section 26c on an upper side.

The tilt operation section 30-19 is a section protruding to an upper side from the tilt panel 20-19.

The tilt operation section 30-19 is provided at a position overlapping the arrangement region (region D1a in FIG. 7) of the touch panel 22 in the left-right direction. In addition, the tilt operation section 30-19 is formed to have a size including an entire region of the touch panel 22 in the left-right direction. That is, the tilt operation section 30-19 is arranged at a position for suppressing unintended contact with the touch panel 22 when a user performs a tilt operation on the tilt panel 20-19.

The tilt operation section 30-19 is provided at a position overlapping the arrangement region (region D1c in FIG. 7) of the icon group 32B in the left-right direction. That is, the tilt operation section 30-19 is arranged at a position for suppressing unintended contact with the icon group 32B when a user performs a tilt operation on the tilt panel 20-19.

Figure 10:
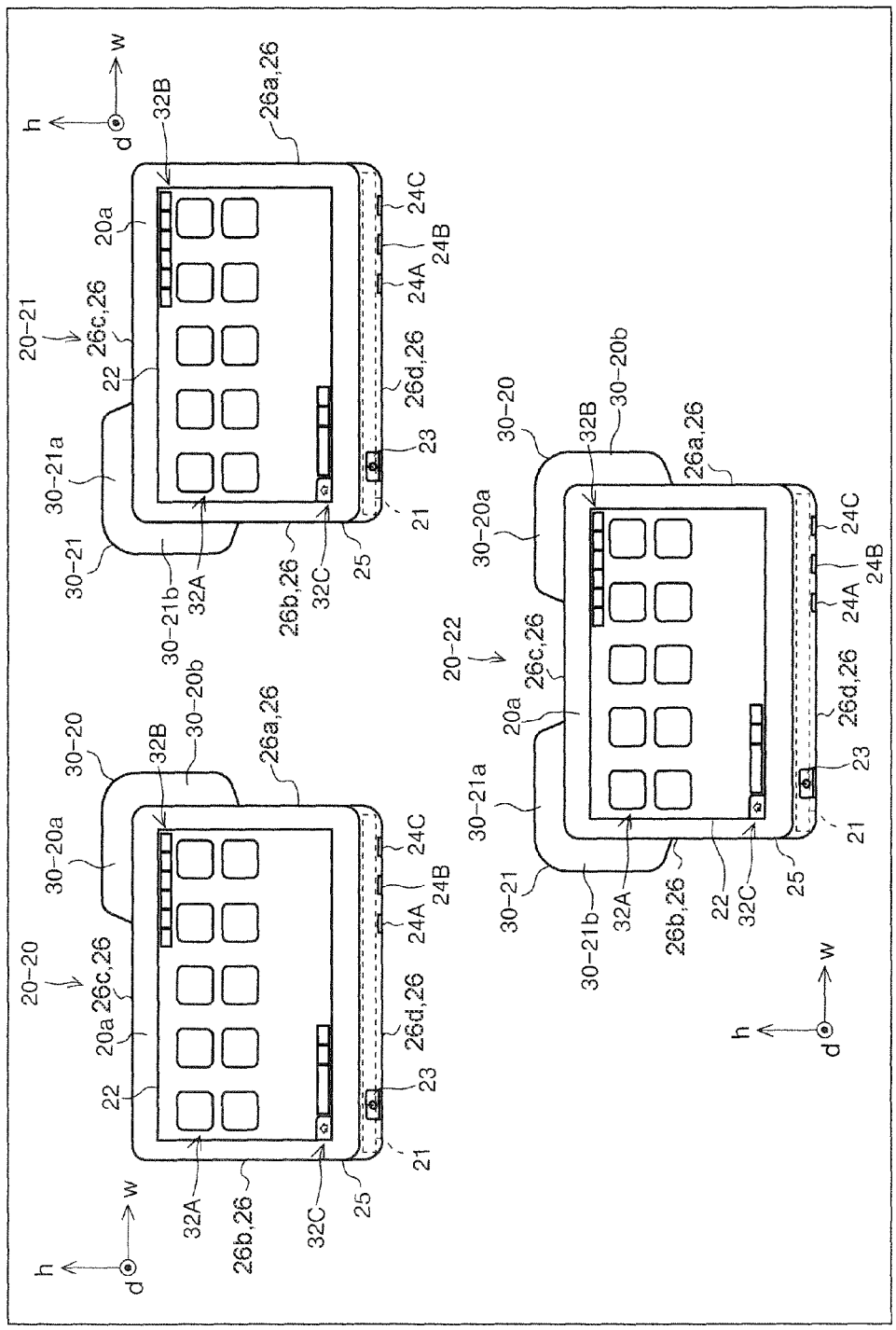
FIG. 10 is a plan view showing each embodiment of the tilt panel with the rotation shaft on the lower side.

A tilt panel 20-20 shown in FIG. 10 is a twentieth embodiment of the tilt panel.

The tilt panel 20-20 includes a tilt operation section 30-20. The tilt operation section 30-20 integrally includes a first tilt operation section 30-20b provided on the first side surface section 26a and a second tilt operation section 30-20a provided on the third side surface section 26c. The first tilt operation section 30-20b is a section protruding to a right side from the tilt panel 20-20, and the second tilt operation section 30-20a is a section protruding to an upper side from the tilt panel 20-20.

The first tilt operation section 30-20b is provided at a position overlapping the arrangement region (region D2a in FIG. 7) of the touch panel 22 in the vertical direction. The second tilt operation section 30-20a is provided at a position overlapping the arrangement region (region D1a in FIG. 7) of the touch panel 22 in the left-right direction. That is, the tilt operation section 30-20 is arranged at a position for suppressing unintended contact with the touch panel 22 when a user performs a tilt operation on the tilt panel 20-20.

The first tilt operation section 30-20b is provided at a position overlapping the arrangement region (region D2b in FIG. 7) of the icon group 32A in the vertical direction. The second tilt operation section 30-20a is provided at a position overlapping the arrangement region (region D1b in FIG. 7) of the icon group 32A in the left-right direction. That is, the tilt operation section 30-20 is arranged at a position for suppressing unintended contact with the icon group 32A when a user performs a tilt operation on the tilt panel 20-20.

The first tilt operation section 30-20b is provided at a position overlapping the arrangement region (region D2c in FIG. 7) of the icon group 32B in the vertical direction. The second tilt operation section 30-20a is provided at a position overlapping the arrangement region (region D1c in FIG. 7) of the icon group 32B in the left-right direction. That is, the tilt operation section 30-20 is arranged at a position for suppressing unintended contact with the icon group 32B when a user performs a tilt operation on the tilt panel 20-20.

A tilt panel 20-21 shown in FIG. 10 is a twenty first embodiment of the tilt panel.

The tilt panel 20-21 includes a tilt operation section 30-21. The tilt operation section 30-21 integrally includes a first tilt operation section 30-21b provided on the second side surface section 26b and a second tilt operation section 30-21a provided on the third side surface section 26c. The first tilt operation section 30-21b is a section protruding to a left side from the tilt panel 20-21, and the second tilt operation section 30-21a is a section protruding to an upper side from the tilt panel 20-21.

The first tilt operation section 30-21b is provided at a position overlapping the arrangement region (region D2a in FIG. 7) of the touch panel 22 in the vertical direction. The second tilt operation section 30-21a is provided at a position overlapping the arrangement region (region D1a in FIG. 7) of the touch panel 22 in the left-right direction. That is, the tilt operation section 30-21 is arranged at a position for suppressing unintended contact with the touch panel 22 when a user performs a tilt operation on the tilt panel 20-21.

The first tilt operation section 30-21b is provided at a position overlapping the arrangement region (region D2b in FIG. 7) of the icon group 32A in the vertical direction. The second tilt operation section 30-21a is provided at a position overlapping the arrangement region (region D1b in FIG. 7) of the icon group 32A in the left-right direction. That is, the tilt operation section 30-21 is arranged at a position for suppressing unintended contact with the icon group 32A when a user performs a tilt operation on the tilt panel 20-21.

A tilt panel 20-22 shown in FIG. 10 is a twenty second embodiment of the tilt panel.

The tilt panel 20-22 includes both the tilt operation section 30-20 and the tilt operation section 30-21 described above.

Figure 11:
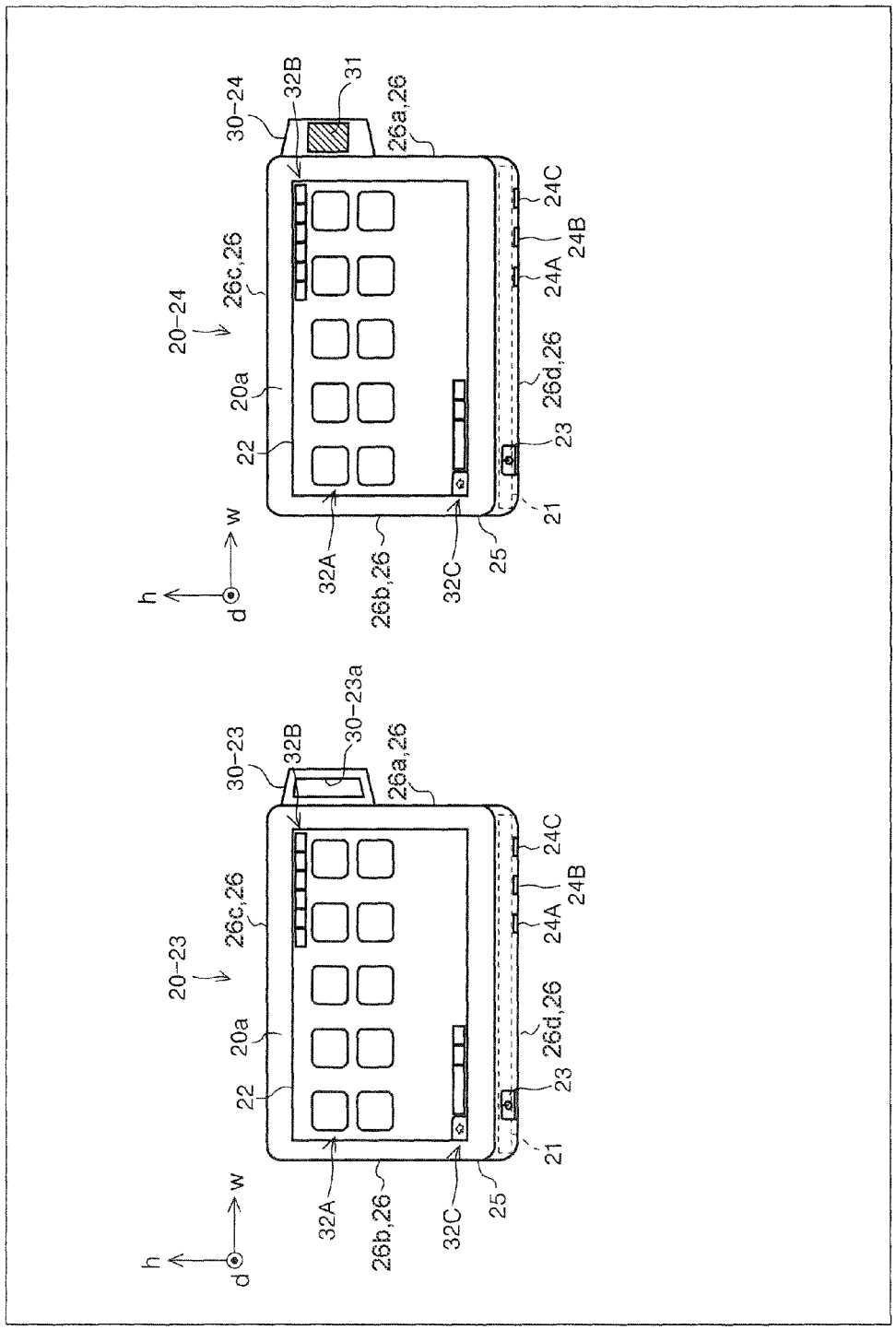
FIG. 11 is a plan view showing an embodiment of the tilt panel with the rotation shaft on the lower side.

A tilt panel 20-23 shown in FIG. 11 is a twenty third embodiment of the tilt panel.

The tilt panel 20-23 includes a tilt operation section 30-23 on the first side surface section 26a on a right side. The tilt operation section 30-23 is a section protruding to a right side from the tilt panel 20-23.

The tilt operation section 30-23 is formed in a frame shape and includes an opening section 30-23a.

The tilt operation section 30-23 is provided at a position overlapping the arrangement region (region D2a in FIG. 7) of the touch panel 22 in the vertical direction. That is, the tilt operation section 30-23 is arranged at a position for suppressing unintended contact with the touch panel 22 when a user performs a tilt operation on the tilt panel 20-23.

The tilt operation section 30-23 is provided at a position overlapping the arrangement region (region D2b in FIG. 7) of the icon group 32A in the vertical direction. That is, the tilt operation section 30-23 is arranged at a position for suppressing unintended contact with the icon group 32A when a user performs a tilt operation on the tilt panel 20-23.

The tilt operation section 30-23 is provided at a position overlapping the arrangement region (region D2c in FIG. 7) of the icon group 32B in the vertical direction. That is, the tilt operation section 30-23 is arranged at a position for suppressing unintended contact with the icon group 32B when a user performs a tilt operation on the tilt panel 20-23.

A tilt panel 20-24 shown in FIG. 11 is a twenty fourth embodiment of the tilt panel.

The tilt panel 20-24 includes a tilt operation section 30-24 on the first side surface section 26a on a right side. The tilt operation section 30-24 is a section protruding to a right side from the tilt panel 20-24.

The tilt operation section 30-24 is provided with a fingerprint authentication section 31. The fingerprint authentication section 31 reads fingerprint information of a user and outputs a signal corresponding to the information to a control section (not shown). The user can use a security function of the printer 1, for example, a function such as authentication printing, by using the fingerprint authentication section 31.

The tilt operation section 30-24 is provided at a position overlapping the arrangement region (region D2*a* in FIG. 7) of the touch panel 22 in the vertical direction. That is, the tilt operation section 30-24 is arranged at a position for suppressing unintended contact with the touch panel 22 when a user performs a tilt operation on the tilt panel 20-24.

The tilt operation section 30-24 is provided at a position overlapping the arrangement region (region D2*b* in FIG. 7) of the icon group 32A in the vertical direction. That is, the tilt operation section 30-24 is arranged at a position for suppressing unintended contact with the icon group 32A when a user performs a tilt operation on the tilt panel 20-24.

The tilt operation section 30-24 is provided at a position overlapping the arrangement region (region D2*c* in FIG. 7) of the icon group 32B in the vertical direction. That is, the tilt operation section 30-24 is arranged at a position for suppressing unintended contact with the icon group 32B when a user performs a tilt operation on the tilt panel 20-24.

Figure 12:
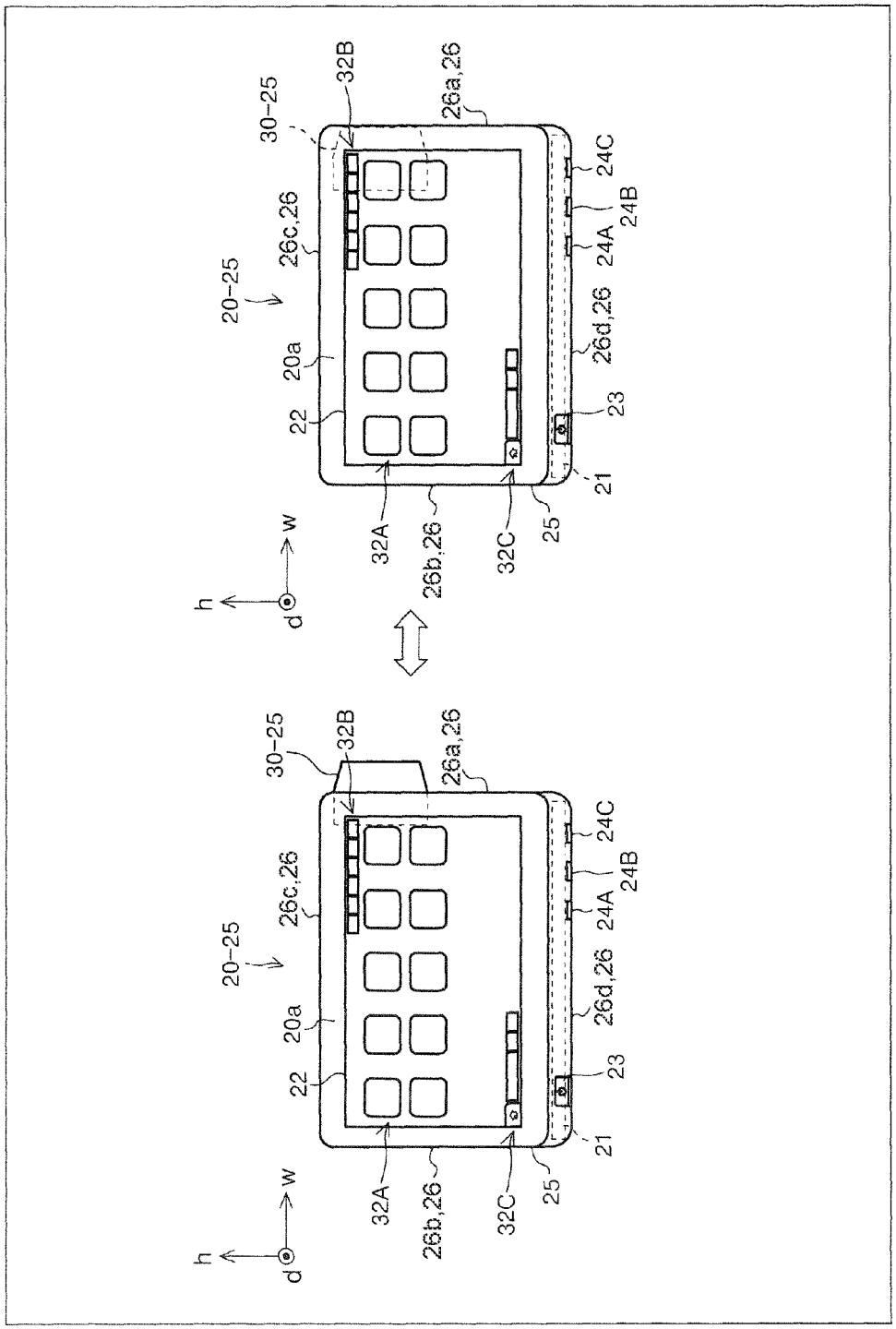
FIG. 12 is a plan view of a tilt panel capable of switching between a first state and a second state.

A tilt panel 20-25 shown in FIG. 12 is a twenty fifth embodiment of the tilt panel.

The tilt panel 20-25 includes a tilt operation section 30-25 on the first side surface section 26*a* on a right side. The tilt operation section 30-25 is a section protruding to a right side from the tilt panel 20-25.

The tilt operation section 30-25 is provided at a position overlapping the arrangement region (region D2*a* in FIG. 7) of the touch panel 22 in the vertical direction.

The tilt operation section 30-25 is provided at a position overlapping the arrangement region (region D2*b* in FIG. 7) of the icon group 32A in the vertical direction.

The tilt operation section 30-25 is provided at a position overlapping the arrangement region (region D2*c* in FIG. 7) of the icon group 32B in the vertical direction.

The tilt operation section 30-25 according to the present embodiment can be switched by a user operation between a first state in which the tilt operation section 30-25 protrudes outward from the tilt panel 20-25 as shown in a left side of FIG. 12 and a second state in which the tilt operation section 30-25 does not protrude from the tilt panel 20-25 as shown in a right side of FIG. 12.

As described above, the printer 1 includes the tilt panel 20 configured to tilt and that performs various setting operations for the device main body 2, and the rotation shaft 21 for tilting the tilt panel 20. The tilt panel 20 includes the housing 25 configured to form the outer peripheral section 26 of the tilt panel 20, and the touch panel 22 provided on a part of the housing 25. The outer peripheral section 26 includes the first side surface section 26*a* extending along the h-axis direction intersecting the w-axis direction which is an axial direction of the rotation shaft 21, a second side surface section 26*b* extending along the h-axis direction and opposite to the first side surface section 26*a*, and the third side surface section 26*c* connecting an end of the first side surface section 26*a* farther from the rotation shaft 21 and an end of the second side surface section 26*b* farther from the rotation shaft 21 and extending along the w-axis direction. At least one of the first side surface section 26*a*, the second side surface section 26*b*, and the third side surface section 26*c* is provided with the tilt operation section 30 which is a section protruding outward from the tilt panel 20. The tilt operation section 30 is provided at a position overlapping an arrangement region of the touch panel 22 in at least one of the w-axis direction and the h-axis direction in a plan view of the touch panel 22.

As a result, even when the frame section 27 around the touch panel 22 becomes small and it becomes easy for a user to touch the touch panel 22 when performing a tilt operation of the tilt panel 20, the user can perform the tilt operation of the tilt panel 20 while suppressing the user from touching the touch panel 22 by placing a finger on the tilt operation section 30, operability when pivoting the tilt panel 20 is improved, and it is possible to suppress the user from unintentionally touching the touch panel 22 and causing an erroneous operation.

An operation icon is displayed on the touch panel 22, and the tilt operation section 30 (30-2, 30-5, 30-6, 30-9, 30-13, 30-14, 30-15, 30-16, 30-17, 30-18, 30-19, 30-20, 30-21, 30-23, 30-24, and 30-25) is provided at a position overlapping the arrangement region of the operation icon in at least one of the w-axis direction and the h-axis direction in a plan view of the touch panel 22.

As a result, even when the frame section around the touch panel 22 becomes small and it becomes easy for a user to touch the operation icon when performing a tilt operation of the tilt panel 20, the user can perform the tilt operation of the tilt panel 20 while suppressing the user from touching the operation icon by placing a finger on the tilt operation section 30, operability when pivoting the tilt panel 20 is improved, and it is possible to suppress the user from unintentionally touching the operation icon and causing an erroneous operation.

The tilt operation section 30 (30-5, 30-6, 30-17, and 30-18) is provided on the first side surface section 26*a* or the second side surface section 26*b*, and is formed to have a size including an entire region of the touch panel 22 in the h-axis direction.

According to such a configuration, a user can easily place his or her finger on the tilt operation section 30.

The tilt operation section 30 (30-7 and 30-19) is provided on the third side surface section 26*c*, and is formed to have a size including an entire region of the touch panel 22 in the w-axis direction.

According to such a configuration, a user can easily place his or her finger on the tilt operation section 30.

The tilt operation section 30 (30-8, 30-9, 30-20, and 30-21) integrally includes the first tilt operation section (30-8*b*, 30-9*b*, 30-20*b*, and 30-21*b*) provided on the first side surface section 26*a* or the second side surface section 26*b*, and the second tilt operation section (30-8*a*, 30-9*a*, 30-20*a*, and 30-21*a*) provided on the third side surface section 26*c*.

According to such a configuration, the degree of freedom of a position where a user places a finger on the tilt operation section 30 is improved, and operability is improved.

The tilt operation section 30 (30-12 and 30-24) includes the fingerprint authentication section 31 for performing fingerprint authentication of a user. According to such a configuration, a dedicated space for arranging the fingerprint authentication section 31 is not required, and the size of the device can be reduced.

The tilt operation section 30-25 can be switched by a user operation between a first state in which the tilt operation section 30-25 protrudes outward from the tilt panel 20-25 as shown in a left side of FIG. 12 and a second state in which the tilt operation section 30-25 does not protrude from the tilt panel 20-25 as shown in a right side of FIG. 12.

According to such a configuration, by setting the tilt operation section 30-25 to the second state, the tilt panel 20-25 can be made compact when the tilt operation section 30-25 is not required.

Needless to say, the present disclosure is not limited to the embodiments described above, and various modifications are possible within the scope of the disclosure described in the claims, which are also included within the scope of the present disclosure.

What is claimed is:

1. A recording device comprising:
    a recording head configured to perform recording on a medium;
    a tilt panel that is configured to tilt and that performs various setting operations for a device main body including the recording head; and
    a rotation shaft for tilting the tilt panel, wherein
    the tilt panel includes
        a housing forming an outer peripheral section of the tilt panel and
        a touch panel provided on a part of the housing, the outer peripheral section includes:
    a first side surface section that extends along a second direction, the second direction intersecting with a first direction, the first direction being an axial direction of the rotation shaft,
    a second side surface section that extends along the second direction and that is at an opposite side from the first side surface section, and
    a third side surface section that extends along the first direction and that connects an end section of the first side surface section farther from the rotation shaft and an end section of the second side surface section farther from the rotation shaft,
    at least one of the first side surface section, the second side surface section, and the third side surface section is provided with a tilt operation lever which is a section protruding in a direction along the rotation shaft from the tilt panel,
    the tilt operation lever is provided at a position overlapping an arrangement region of the touch panel in at least one of the first direction and the second direction in a plan view of the touch panel, and
    a thickness of the tilt operation lever is formed to be smaller than a thickness of the tilt panel.

2. The recording device according to claim 1, wherein
an operation icon is displayed on the touch panel and
the tilt operation lever is provided at a position overlapping an arrangement region of the operation icon in at least one of the first direction and the second direction in a plan view of the touch panel.

3. The recording device according to claim 1, wherein
the tilt operation lever is provided on the first side surface section or the second side surface section, and is formed to have a size including an entire region of the touch panel in the second direction.

4. The recording device according to claim 1, wherein
the tilt operation lever is provided on the third side surface section and is formed to have a size including an entire region of the touch panel in the first direction.

5. The recording device according to claim 1, wherein
the tilt operation lever integrally includes a first tilt operation lever provided on the first side surface section or the second side surface section and a second tilt operation lever provided on the third side surface section.

6. The recording device according to claim 1, wherein
the tilt operation lever includes a fingerprint authentication section for performing fingerprint authentication of a user.

7. The recording device according to claim 1, wherein
the tilt operation lever is provided configured to switch between a first state in which the tilt operation lever protrudes outward from the tilt panel and a second state in which the tilt operation lever does not protrude outward from the tilt panel in a plan view of the touch panel.

8. The recording device according to claim 1, wherein
a length of the tilt operation lever is shorter than a length of the first side surface section, the second side surface section, and the third side surface section.

9. The recording device according to claim 1, wherein
the tilt operation lever is a rectangle having a first side formed by any one of the first side surface section, the second side surface section, and the third side surface section.

10. The recording device according to claim 9, wherein
a second side and a third side configured to form the tilt operation lever and intersect with the first side approach each other as the second side and the third side move away from the first side.

* * * * *